United States Patent Office 3,021,351
Patented Feb. 13, 1962

3,021,351
PHOSPHORUS DERIVATIVES AND PROCESS FOR THEIR PRODUCTION
Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Apr. 28, 1960, Ser. No. 25,211
Claims priority, application Germany May 2, 1959
11 Claims. (Cl. 260—461)

The present invention relates to and has as its objects new and useful insecticidally active compounds and processes for their production. The new compounds of the present invention are (di)-thiophosphoric, phosphonic or phosphinic acid-(p-alkylmercaptophenyl-mercaptoethyl)-esters (or amides).

The p-alkylmercapto-thiophenols which have hitherto not been described in the literature, may be used as starting materials for the production of insecticidal phosphoric acid esters. The aforesaid p-alkylmercapto-thiophenols may be obtained, in an analogous manner to that for similar compounds, from the readily obtainable p-alkylmercaptophenyl-sulfonic acid chlorides by reduction with zinc dust.

By condensation of p-alkylmercapto-thiophenols with ethylene bromide or chlorobromethane there may readily be obtained the β-bromethyl- or β-chlorethyl-(-p-alkyl mercaptophenyl)-thioethers of the following formula

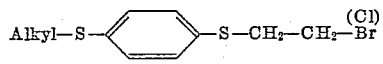

The reaction of β-bromo-(or -chloro-)-ethyl-(p-alkyl-mercaptophenyl)-thioethers with salts of monothio-or dithiophosphoric, -phosphonic or -phosphinic acid esters or amides there are obtained in good yields compounds of the following general formula

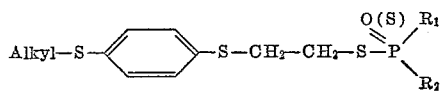

In the above formula $R_1$ and $R_2$ stand for alkoxy groups, preferably containing 1-4 carbon atoms, for aliphatic or aromatic radicals or amino groups which may be substituted.

The new compounds are distinguished in addition to a good contact activity against insects by a markedly ovicidal action especially against the eggs of the red spider. The new esters may also be used with good results against eating pests such as caterpillars. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the compounds of the following formulae (I)

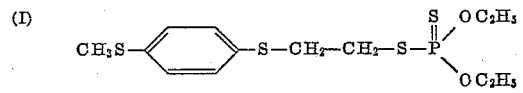

(II)

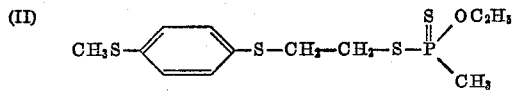

have been tested against aphids and spider mites. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) against aphids (species *Doralis fabae*). Heavily infested bean plants (*Vitia faba*) have been sprayed drip wet with solutions as prepared above in a concentration as shown below. The effect has been determined after 24 hours by counting the dead pests either on the surface of the soil or still remaining on the plants. The following results have been obtained:

| Compound | aqueous concentration (in percent active ingredient/water) | killing rate (in percent) |
|---|---|---|
| (I) | 0.0001 | 100 |
| (II) | 0.01 | 100 |

(b) against spider mites (contact-insecticidal action). Bean plants (*Phaseolus vulgaris*) of about 15 inches height are sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The following results have been obtained:

| Compound | aqueous concentration (in percent active ingredient/water) | killing rate (in percent) |
|---|---|---|
| (I) | 0.01 | 100 |
| (II) | 0.0001 | 90 |

The following examples are given for the purpose of illustrating the process according to the invention.

Example 1

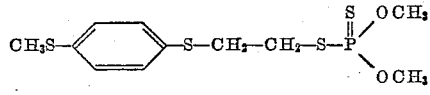

40 grams (0.2 mol) of dimethyl-dithiophosphoric acid ammonium salt are dissolved in 75 cc. of methyl ethyl ketone; 30 cc. of dimethyl formamide and 53 grams (0.2 mol) of β-bromethyl-(p-methylmercaptophenyl)-thioether (M. P. 51° C.) are then added at 40° C. The mixture is heated to 70° C. with stirring for one hour, and the reaction product then allowed to cool. The reaction product is poured into 500 cc. of ice water. The precipitated oil is taken up in benzene. The benzene solution is thoroughly washed with water and subsequently dried with sodium sulfate. The benzene is distilled off in a vacuum. 34 grams of a pale yellow water-insoluble oil remain which may be distilled only with decomposition even in a high vacuum. Yield 50% of the theoretical.

On rats per os the new compound shows a toxicity of 100 mg./kg. $LD_{50}$. Mosquito larvae are killed completely with 0.001% solutions and aphids are killed to 60% with 0.001% solutions.

By exactly the same way there may be obtained the following compounds:

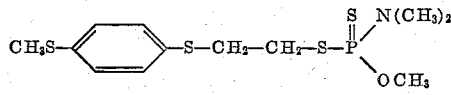

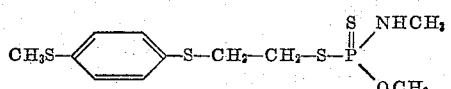

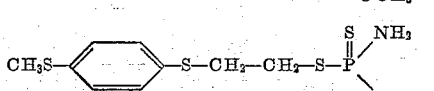

Example 2

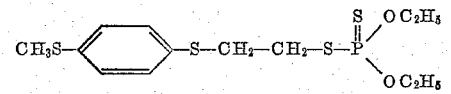

45 grams (0.2 mol) of diethyl-dithiophosphoric acid ammonium salt are dissolved in 70 cc. of methyl ethyl ketone. 53 grams (0.2 mol) of β-bromoethyl-(p-methyl-mercapto-phenyl)-thioether, dissolved in 30 cc. of dimethyl formamide, are added with stirring. The mixture is heated to 70° C. for one hour and then worked up as described in Example 1. 40 grams of the new ester are thus obtained as a yellow water-insoluble oil. Yield 55% of the theoretical.

The physical data are as follows: $d_4^{20}$ 1.235; $n_D^{20}$ 1.6115. On rats per os toxicity 5 mg./kg. $LD_{50}$. Systemic action on spider mites with 0.1% solutions=100%. The compound has an ovicidal action.

Example 3

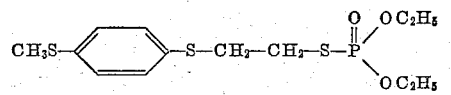

50 grams (0.2 mol) of diethyl-monothiophosphoric acid ammonium salt are dissolved in 70 cc. of methyl ethyl ketone. A solution of 53 grams (0.2 mol) of β-bromoethyl-(p-methyl-mercapto-phenyl)-thioether in 40 cc. of dimethyl formamide are then added with stirring. The temperature is kept at 70° C. for 2 hours and the product then worked up in usual manner. 68 grams of the new ester are thus obtained as a yellow water-insoluble oil. Yield 95% of the theoretical.

The physical constants are as follows: $d_4^{20}$ 1.205; $n_D^{20}$ 1.5719. On rats per os $LD_{50}$ 5 mg./kg. Aphids are killed completely with 0.001% solutions and spider mites are killed completely with 0.01% solutions.

By exactly the same way there may be obtained the following compound:

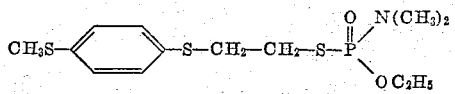

Example 4

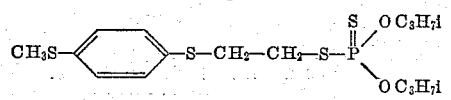

55 grams (0.2 mol) of diisopropyl-dithiophosphoric acid ammonium salt are dissolved in 70 cc. of methyl ethyl ketone. A solution of 53 grams of β-bromoethyl-(p-methylmercapto-phenyl)-thioether in 30 cc. of dimethyl formamide is then added with stirring. The mixture is kept at 80° C. for 2 hours and then worked up in usual manner. 77 grams of the new ester are thus obtained as a pale yellow water-insoluble oil. Yield 93% of the theoretical.

The physical data are the following: $d_4^{20}$ 1.170; $n_D^{20}$ 1.5880. On rats per os $LD_{50}$ 100 mg./kg. Aphids are killed to 90% with 0.001% solutions.

By the same way there may be obtained the following compounds:

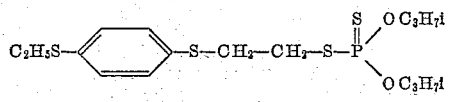

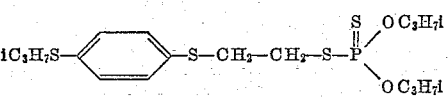

Example 5

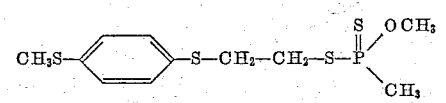

20 grams (0.1 mol) of methyl-O-methyl ester-dithiophosphonic acid potassium salt are dissolved in 75 cc. of acetonitrile. 27 grams (0.1 mol) of β-bromoethyl-(p-methyl-mercaptophenyl)-thioether in 75 cc. of acetonitrile are added with stirring at 60–70° C. The mixture is kept at 70° C. for 2 hours and then worked up in usual manner. 28 grams of the new ester are thus obtained in the form of a pale yellow water-insoluble oil. Yield 86% of the theoretical.

Calculated for mol 325: S, 39.4%; P, 9.5%. Found: S, 39.0%; P, 9.0%. On rats per os toxicity 2.5 mg./kg. $LD_{50}$. Spider mites were killed completely with 0.001% solutions, aphids with 0.01% solution, mosquito larvae with 0.00001% solutions and caterpillars with 0.1% solutions. Systemic action with 0.1% solutions=100%.

By exactly the same way there may be obtained the following compound:

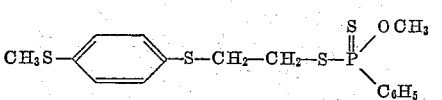

Example 6

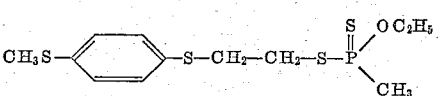

22 grams (0.1 mol) of methyl—O-ethyl ester-dithiophosphonic acid potassium salt are dissolved in 50 cc. of acetonitrile. 27 grams (0.1 mol) of β-bromoethyl-(p-methyl-mercaptophenyl)-thioether, dissolved in 75 cc. of acetonitrile, are then added at 70° C. with stirring. The mixture is kept at 75° C. for 2 hours and then worked up in usual manner. 31 grams of the new ester are thus obtained as a yellow water-insoluble oil. Yield 91% of the theoretical.

Calculated for mol 338: S, 37.9%; P, 9.1%. Found: S, 37.9%; P, 9.0%. On rats per os $LD_{50}$ 2.5 mg./kg. Caterpillars are killed completely with 0.1% solutions.

Example 7

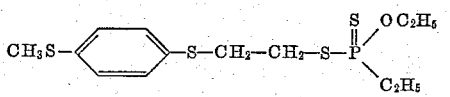

23 grams (0.1 mol) of ethyl—O-ethyl ester-dithiophosphonic acid potassium salt are dissolved in 50 cc. of acetonitrile. 27 grams (0.1 mol) of β-bromoethyl-(p-methylmercaptophenyl)-thioether, dissolved in 75 cc. of acetonitrile, are then added at 70° C. with stirring. The mixture is kept at 75–80° C. for 2 hours and then worked up in usual manner. 32 grams of the new ester are obtained as a yellow water-insoluble oil. Yield 90% of the theoretical.

Calculated for mol 353: S, 36.25%; P, 8.7%. Found: S, 37.0%; P, 8.9%. On rats per os toxicity 2.5 mg./kg. $LD_{50}$. Aphids are killed completely with 0.001% solutions and spider mites are killed to 90% with 0.0001% solutions.

By exactly the same way there may be obtained the following compound:

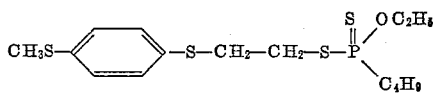

*Example 8*

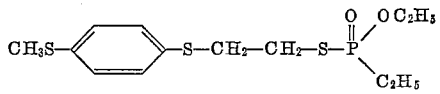

21 grams (0.1 mol) of ethyl-phosphono-O-ethyl ester-thiolic acid potassium salt are dissolved in 50 cc. of acetonitrile. 27 grams (0.1 mol) of β-bromoethyl-(p-methylmercapto-phenyl)-thioether, dissolved in 75 cc. of acetonitrile, are then added at 60–70° C. with stirring. After working up in the usual manner, 33 grams of the new ester are obtained as a colorless, scarcely water-soluble oil.

Calculated for mol 336: S, 28.6%; P, 9.2%. Found: S, 28.4%; P, 9.4%. On rats per os toxicity 1 mg./kg. $LD_{50}$. Aphids are killed to 90% with 0.001% solutions and spider mites are killed completely with 0.001% solutions. Systemic action with 0.1% solutions=100%.

By exactly the same way there may be obtained the following compounds:

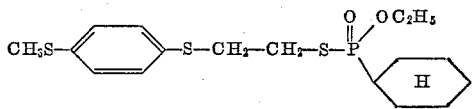

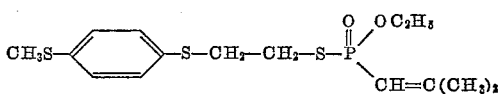

*Example 9*

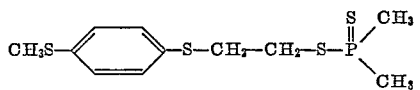

40 grams (0.2 mol) of dimethyl-thionothiolphosphinic acid potassium salt are dissolved in 100 cc. of acetonitrile. 54 grams (0.2 mol) of β-bromoethyl-(p-methylmercaptophenyl)-thioether, dissolved in 100 cc. of acetonitrile, are added at 65° C. with stirring. The mixture is kept at 65° C. for 2 hours and then worked up in the usual manner. 57 grams of the new ester are obtained as a yellow water-insoluble oil. Yield 92% of the theoretical.

Calculated for mol 308: S, 41.5%; P, 10.0%. Found: S, 41.3%; P, 9.5%. On rats per os toxicity 250 mg./kg. $LD_{50}$. Spider mites are killed completely with 0.01% solutions. Systemic action with 0.1% solutions=100%.

*Example 10*

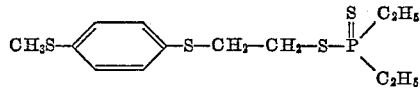

23 grams (0.1 mol) of diethyl-thionothiolphosphinic acid potassium salt are dissolved in 50 cc. of acetonitrile. 27 grams (0.1 mol) of β-bromoethyl-(p-methylmercaptophenyl)-thioether, dissolved in 75 cc. of acetonitrile, are added at 70° C. with stirring. The mixture is kept at 75° C. for one hour and then worked up in the usual manner. 32 grams of the new ester are obtained as a yellow water-insoluble oil. Yield 95% of the theoretical.

Calculated for mol 337: S, 38.0%; P, 9.2%. Found: S, 38.1%; P, 9.2%. On rats per os toxicity 50 mg./kg. $LD_{50}$. Spider mites are killed to 80% with 0.001% solutions. Systemic action with 0.1% solutions=100%.

By exactly the same way there may be obtained the following compound:

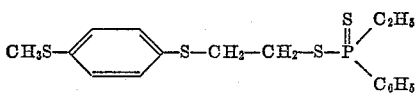

We claim:
1. The compound of the following formula

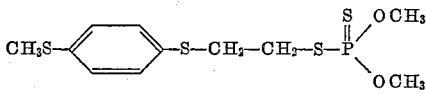

2. The compound of the following formula

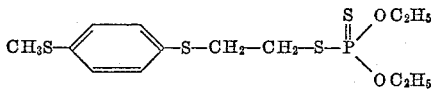

3. The compound of the following formula

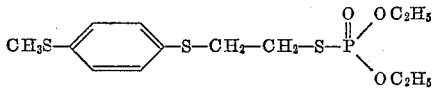

4. A compound of the following formula

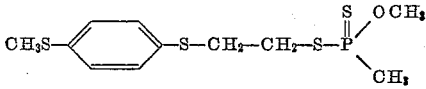

5. The compound of the following formula

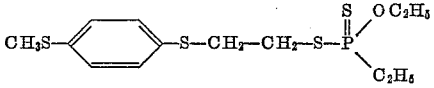

6. The compound of the following formula

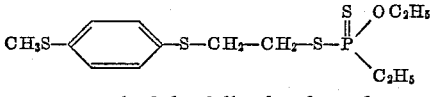

7. The compound of the following formula

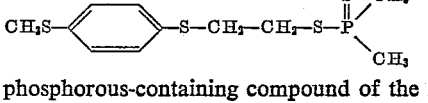

8. A phosphorous-containing compound of the following formula

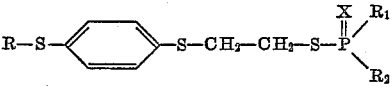

in which R stands for a lower alkyl radical having up to four carbon atoms, $R_1$ stands for a member selected from the group consisting of a lower alkoxy radical having up to four carbon atoms, a lower alkyl radical having up to six carbon atoms, a lower alkenyl radical having up to 6 carbon atoms, an amino group, a lower alkyl amino group having up to four carbon atoms and a lower dialkyl amino group having up to four carbon atoms, $R_2$ stands for a member selected from the group consisting of a lower alkoxy group having up to four carbon atoms, a lower alkyl radical having up to six carbon atoms lower alkenyl radical having up to 6 carbon atoms, cyclohexyl and a phenyl group, and X stands for a chalcogen having an atomic weight between 16 and 33.

9. A phosphorus containing compound of claim 8 wherein $R_1$ and $R_2$ each stand for a lower alkoxy radical having up to four carbon atoms.

10. A phosphorus containing compound of claim 8 wherein $R_1$ and $R_2$ each stand for a lower alkyl radical having up to six carbon atoms.

11. A phosphorus containing compound of claim 8 wherein $R_1$ stands for a lower alkoxy radical having up to four carbon atoms and $R_2$ stands for a lower alkyl radical having up to six carbon atoms.

No references cited.

UNITED STATES PATENT OFFICE
CERTIFICATE OF CORRECTION

Patent No. 3,021,351            February 13, 1962

Ernst Schegk et al.

It is hereby certified that error appears in the above numbered patent requiring correction and that the said Letters Patent should read as corrected below.

Column 1, line 34, for "The" read -- By --; column 2, line 58, for "β-bromethyl-" read -- β-bromoethyl- --; column 6, lines 33 to 35, the formula should appear as shown below instead of as in the patent:

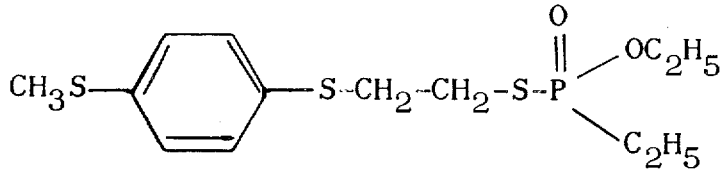

Signed and sealed this 21st day of August 1962.

(SEAL)
Attest:

ESTON G. JOHNSON            DAVID L. LADD
Attesting Officer            Commissioner of Patents